United States Patent
Sinclair et al.

(10) Patent No.: US 12,433,205 B2
(45) Date of Patent: Oct. 7, 2025

(54) PLANT INJECTION APPARATUS AND METHOD

(71) Applicant: SYNGENTA CROP PROTECTION AG, Basel (CH)

(72) Inventors: Grant Sinclair, Oamaru (NZ); Paul Buckley, Oamaru (NZ)

(73) Assignee: SYNGENTA CROP PROTECTION AG, Basel (CH)

( * ) Notice: Subject to any disclaimer, the term of this patent is extended or adjusted under 35 U.S.C. 154(b) by 62 days.

(21) Appl. No.: 18/007,095

(22) PCT Filed: Jul. 28, 2021

(86) PCT No.: PCT/EP2021/071189
§ 371 (c)(1),
(2) Date: Jan. 27, 2023

(87) PCT Pub. No.: WO2022/023436
PCT Pub. Date: Feb. 3, 2022

(65) Prior Publication Data
US 2023/0240198 A1 Aug. 3, 2023

(30) Foreign Application Priority Data
Jul. 28, 2020 (NZ) ........................................ 766513

(51) Int. Cl.
*A01G 7/06* (2006.01)
*G05D 16/20* (2006.01)
*H02P 25/06* (2016.01)

(52) U.S. Cl.
CPC ........... *A01G 7/06* (2013.01); *G05D 16/2066* (2013.01); *H02P 25/06* (2013.01)

(58) Field of Classification Search
CPC ........ A01G 7/06; B05B 9/047; B05B 9/0838; B05B 11/02; B05C 17/00576; B05C 17/01
(Continued)

(56) References Cited

U.S. PATENT DOCUMENTS 9,435,458 B2 * 9/2016 Needham ............ F16K 31/0658
10,455,774 B2 * 10/2019 Davis ...................... A01G 7/06
(Continued)

FOREIGN PATENT DOCUMENTS

WO    2015110535 A1    7/2015
WO    2015112027 A1    7/2015

OTHER PUBLICATIONS

WIPO; App. No. PCT/EP2021/071189; International Search Report and Written Opinion dated Nov. 9, 2021; pp. 1-11.

Primary Examiner — Joshua D Huson
Assistant Examiner — Katherine Anne Kloecker
(74) Attorney, Agent, or Firm — BakerHostetler; Toni-Junell Herbert (57) ABSTRACT

Apparatus for injecting liquid into a plant comprising a variable volume dosing chamber with a plunger disposed within the chamber and a chamber inlet and outlet, the inlet and outlet in fluid communication with a common volume of the chamber. The apparatus also comprises a motor and a processor. The motor is configured to drive movement of the piston plunger causing a change in volume in the chamber. The processor is configured to control voltage and power to the motor by creating a plurality of pulses of power that provide energy to said motor; to identify a change in pressure of the liquid discharged from the outlet during an injection operation by monitoring the motor current or the number of revolutions of the motor; and to vary pulse force
(Continued)

in response to the identified change in pressure to control the pressure of the liquid discharged from the outlet.

27 Claims, 8 Drawing Sheets

(58) Field of Classification Search
USPC .......................................................... 47/57.5
See application file for complete search history.

(56) References Cited

U.S. PATENT DOCUMENTS

| | | | |
|---|---|---|---|
| 10,731,594 B2* | 8/2020 | Kusakabe | ............... F02B 75/02 |
| 10,994,292 B2* | 5/2021 | Dau | ........................ B05B 5/057 |
| 11,844,318 B2* | 12/2023 | Schupbach | ............... A01G 7/06 |
| 2004/0079169 A1* | 4/2004 | Wild | ........................ A01G 7/06 |
| | | | 73/861 |
| 2013/0326944 A1* | 12/2013 | Obrist | ...................... A01G 7/06 |
| | | | 47/57.5 |
| 2014/0345194 A1* | 11/2014 | Vue | .......................... A01G 7/06 |
| | | | 47/57.5 |

* cited by examiner

PLANT INJECTION APPARATUS AND METHOD

CROSS-REFERENCE TO RELATED APPLICATIONS

This application is a 371 National Stage Application of International Application No. PCT/EP2021/071189, filed Jul. 28, 2021, which claims priority to NZ Application No. 766513, filed Jul. 28, 2020, the entire contents of which are incorporated by reference herein.

FIELD OF THE INVENTION

The present disclosure relates generally to apparatus and methods for the treatment of plants including trees and palms, and any parts of the plants (such as fruits), by injection with liquid compositions.

BACKGROUND

Apparatus and methods for the treatment of plants, including trees and palms, by injection with liquid compositions have been described, for example in WO2012114197, U.S. Pat. No. 8,726,567, WO14060630 WO15110535, WO15187920 and WO20021041. Likewise, apparatus for accurately dispensing a dose of fluid has been described, for example, in WO15112027. However, the apparatus is specifically adapted for dispensing a fluid medicament to an animal.

For example, arborists may pressure inject liquid compositions, such as pesticides, growth regulators, biostimulants, enhancement products, nutritional products and/or fertilizers, into the sapwood of plants such as trees and palms through drill holes sealed with plugs. In one of the known methods, the trunk or stem diameter at breast height (DBH) of a tree is measured to determine appropriate dosage and the number of drill holes. Typically, the drill holes are sealed by plugs after drilling. Then, injection of a liquid composition into the tree is made under pressure (typically 2 to 4 bar depending on plant species) via the one or more drill holes.

One problem with conventional constant pressure injection methods arises when injection resistance is encountered due to unique tree growth characteristics and environmental conditions. Injection resistance or backpressure conditions can increase risk of physical damage to the bark and/or sapwood of the tree or result in liquid splash back that can reduce operator safety and hygiene.

U.S. Pat. No. 8,726,567 describes a hand-held tree injection device that comprises a piston that slides within a cylinder wherein an electronic pressure sensor is located in the piston head. The pressure sensor conveys the information to an onboard CPU to adjust the movement of the motorized gear assembly and piston combination to follow a preprogrammed pressure profile. The device is very reliant on continuous pressure sensor accuracy and correlation of pressure information to piston movement to ensure the correct injection pressure.

There is a continued need for plant injection apparatus and methods that can adapt during an injection operation to deliver a target dosage at a recommended injection pressure without requiring an onboard pressure sensor.

GENERAL DESCRIPTION OF THE INVENTION

There is provided apparatus for use in injecting a liquid into a plant, the apparatus comprising: a variable volume dosing chamber with a plunger disposed within the chamber and a chamber inlet and outlet, the inlet and outlet in fluid communication with a common volume of the chamber. The plunger (or piston) translates in a linear direction relative to the chamber along a common longitudinal axis. The apparatus also comprises a power source and an electric motor configured to drive translation movement of the plunger via a threaded shaft causing a change in volume in the chamber. As a result, a liquid is alternatively received into the chamber via the inlet or discharged from the chamber via the outlet based on the direction that the plunger is being translated by the motor along the common axis. The apparatus also comprises a trigger.

The apparatus further comprises a processor (or controller) in communication with the power source, the electric motor, and the trigger. The processor is configured, for example, to identify a change pressure of the liquid discharged from the outlet during an injection operation by monitoring the motor current or the number revolutions of the motor. For example, the number of steps per motor revolution in a given time (step count) and comparing the same to a target step count can be used for this purpose. The processor also is configured to control voltage to the motor, and to control power to the motor by creating a plurality of pulses of power to energize the motor (pulse force). The processor can also vary the pulse force in response to the identified change in pressure to control the pressure of the liquid discharged from the outlet during an injection operation. In one embodiment, the processor varies the time between such pulses of power to the motor (off time) in response to a change in the step count wherein a target step count is correlated to a desired outlet pressure. The time between pulses is used to control the step count in a given time and thereby optimize the pressure of the liquid discharged from the outlet during an injection operation.

In another embodiment, the pulse force, which is defined by the voltage and/or current, the off time and the length of the pulse, is varied by maintaining the time between pulses (off time), and by varying the voltage, the current (amperage) and/or the pulse time to control the outlet discharge pressure.

The pressure of the liquid discharged from the outlet during an injection operation may be controlled to maintain a predetermined injection pressure.

Once actuated, the apparatus delivers a metered dose volume by injection into to the target plant through the outlet and via a discharge nozzle at the tip of a tree injection wand or lance that is engaged with an appropriate drill hole in the plant and having an optional plug. In one embodiment, the plug may be positioned on the tip of the wand or lance, and the injector may be pushed toward a drill hole in a plant such as a tree trunk so as to introduce and mount the plug in the drill hole using such wand or lance. More specifically, the plug may be releasably mounted on the tip of the wand's nozzle during the introducing of the plug into, and the mounting of the plug within, the drill hole.

The processor varies the time between motor pulses (off time) to maintain a target injection pressure while delivering the selected dose volume. This is advantageous, as, for example, the injection pressure can be dynamically adjusted and/or maintained in line with a target pressure during an injection operation without a pressure sensor. If, for example, the liquid is injected into the tree at a slower than expected rate, and so back pressure is built up, the off time can be increased to maintain the target injection pressure. Also, a selected dose volume may be correlated to a total step count associated with a particular injection operation.

After the injection is complete, the processor translates the plunger to automatically refill the dose chamber with liquid from a liquid product supply attached to the apparatus via the inlet.

The inventive system can be used with any number of known tree injection protocols where drill holes are closed with tight sealing plugs or with an adapter on the injector side; and liquid compositions are injected under low pressure (such as 1 to 5 bars). Suitable protocols can be those which use an injection gun with or without an injection needle and/or with or without the use of an injection plug. Preferably the tip of the wand nozzle is needleless and plug is used (depending on plant species and whether a wand or lance is used). The appropriate protocol will depend upon various factors including the nozzle tip, the tree species, the target (insect, nematode, disease, abiotic stress, nutrition, etc.), the injection liquid composition components and/or viscosity, the dose volume required and the injection pressure. Dose rates are based on trunk Diameter at Breast Height (DBH), which can be measured with caliper or calculated from the circumference dividing it by 3.14 (Pi)

An advantage of the inventive system is that it is suitable for use in numerous plant species including the gymnosperms (conifers; softwood trees) and angiosperm dicots (broad leaf; hardwood trees) as well as angiosperm monocots such as palms. (Palms are not strictly classified as trees even though they are often included in tree trunk injection.)

An encoder may be mounted on the motor to register motor revolutions. The encoder may output a set number of steps per motor revolution. The processor may be configured to count the number of steps from the encoder. The processor may be configured to compare the counted number of steps in a given time to a target number of steps in a given time to identify a change in pressure of the liquid discharged from the outlet during an injection operation. The processor can also receive the counted number of steps in a given time from the encoder to measure a variable volume of the dosing chamber.

A correlation between desired outlet pressures and a target step count (the number of steps in a given time) is made and stored in processor memory. The calculated difference between the target step count and the counted number of steps may be used to look up gain to be applied to the off time in stored data such as a look-up table, wherein the stored data comprises gain values correlating to calculated differences, and the gain may be applied to the off time, by the processor, to vary the time between the pulses of power to the motor. This is advantageous as the pressure of the injected fluid then can be dynamically controlled during an injection operation without the need for pressure sensors located in the apparatus.

When the apparatus comprises an encoder, a correlation between desired outlet pressures and other pulse force parameters also can be made and stored in processor memory.

Embodiments according to the invention for controlling the pulse force with an encoder are provided as set out below. The pulse force parameters that can be varied in these embodiments are selected from off time, pulse time, voltage and current.

In one embodiment, the processor controls the pulse force by varying the pulse time, while maintaining the voltage and the off time, and measuring the encoder steps.

In another embodiment, the processor controls the pulse force by varying the current, while maintaining the pulse time, the voltage and the off time, and measuring the encoder steps.

In a further embodiment, the processor controls the pulse force by varying the voltage, while maintaining the pulse time and the off-time and measuring the encoder steps.

In a preferred embodiment, the processor controls the pulse force by varying the off time, while maintaining the voltage and the pulse time, and measuring the encoder steps.

Alternatively, the processor may identify a change in pressure of the liquid discharged from the outlet during an injection operation by comparing a measured value of motor current with a predetermined value of motor current.

A calculated difference between the predetermined value of motor current and the measured value of motor current may be used to look up gain to be applied to the off time in stored data such as a look-up table, wherein the stored data comprises gain values correlating to calculated difference, and the gain may be applied to the off time, by the processor, to vary the time between the pulses of power to the motor. Likewise, this configuration is advantageous as the pressure of the injected fluid can be dynamically controlled without the need for pressure sensors located in the apparatus, and the motor output can be monitored without requiring an encoder to count the number of steps per motor revolution.

Likewise, when the apparatus does not comprise an encoder, a correlation between desired outlet pressures and other pulse force parameters also can be made and stored in processor memory.

Embodiments according to the invention for controlling the pulse force without an encoder are provided as set out below. The pulse force parameters that can be varied in these embodiments are selected from off time, pulse time, and voltage.

In one embodiment, the processor controls the pulse force by varying the pulse time, while maintaining the voltage and the off time, and measuring the current.

In another embodiment, the processor controls the pulse force by varying the voltage, while maintaining the pulse time and the off time, and measuring the current.

In a further embodiment, the processor controls the pulse force by varying the off time, while maintaining the voltage and the pulse time, and measuring the current.

The apparatus may further comprise a sensor in communication with the processor that is mounted to detect the linear axial position of the plunger relative to the chamber. This is advantageous as the processor can account for any wear or slippage in the apparatus. In an alternative embodiment, as piston travel can also be correlated with motor revolutions, the steps of the linear axial position sensor are measured in lieu of measuring the encoder steps in the embodiments according to the invention for controlling the pulse force.

The apparatus may further comprise an integrated injection gun with a hand grip that is actuated by a trigger.

The apparatus may further comprise a keypad interface having one or more displays controlled via touch screen and/or controlled via one or more buttons or switches.

In another embodiment, the apparatus comprises communication means configured to transmit information about the device to an external receiver, wherein the processor is configured to instruct the communication means to transmit information to the external receiver when, for example, a communication status is activated by a user.

Any suitable communication means may be used. For example, the communication means may be configured to transmit information via WiFi, Bluetooth, ZigBee or similar.

The pressure of the liquid discharged from the outlet during an injection operation may be controlled when the processor generates a pulse, determines gain from a look up table, obtains a new off time value by adding the gain from the look up table to the current off time, stores the new off time value; and applies the new off time value to the next pulse cycle.

In one embodiment, the apparatus comprises a pressure sensor or transducer. In a preferred embodiment, the apparatus does not contain or require a pressure sensor or transducer.

The voltage, current, pulse width (pulse time) and off time may be calibrated to provide a correlation with pressure. The gain may be calibrated against changes in pressure by applying a known backpressure to the apparatus.

For example, a correlation can be made during a development phase, a calibration phase or as a factory pre-set, by placing a pressure transducer in the outlet circuit between the chamber outlet valve and the tree, then recording and comparing the pressure data with the voltage, pulse time, off time, current and step count to determine the relationship between the values and store in processor memory. These values can be applied to and stored in the processor memory of each apparatus of similar design with adjustments made for electric motor power of a particular apparatus.

There is also provided a method of injecting liquid into a plant, the method comprising the steps of: providing a variable volume dosing chamber with a plunger disposed within the chamber and a chamber inlet and outlet, the inlet and outlet in fluid communication with a common volume of the chamber, wherein the plunger translates in a linear direction relative to the chamber along a common longitudinal axis; a power source; a motor configured to drive translation movement of the piston plunger via a threaded shaft causing a change in volume in the chamber and liquid to be alternatively received and discharged from the chamber; a trigger; and a processor in communication with the power source, the motor and the trigger; controlling, using the processor, voltage to the motor, and power to the motor by creating a plurality of pulses of power that provide energy to said motor (pulse force); identifying, using the processor, a change in pressure of the liquid discharged from the outlet during an injection operation by monitoring the motor current or the number of revolutions of the motor; and varying, using the processor, the pulse force in response to the identified change in pressure to control the pressure of the liquid discharged from the outlet during an injection operation.

In a preferred embodiment, the method comprises varying, using the processor, the time between the pulses of power to the motor (off time) in response to the identified change in pressure, whereby the time between pulses is used to control the pressure of the liquid discharged from the outlet during an injection operation.

The pressure of the liquid discharged from the outlet during an injection operation may be controlled to maintain a predetermined injection pressure.

The processor may count the number of steps or revolutions from an encoder. The encoder may be mounted on the motor to register motor revolutions and to output a set number of steps per motor revolution. The processor may compare the counted number of revolutions to a target number of revolutions to identify a change in pressure of the liquid discharged from the outlet during an injection operation.

The processor may calculate a difference between the target number of motor revolutions and the counted number of motor revolutions, and look up gain to be applied to a pulse force parameter selected from off time, pulse time, voltage and current, in stored data, wherein the stored data comprises gain values correlating to calculated differences, and wherein the processor may vary the pulse force by applying the gain to a selected pulse force parameter.

The processor may calculate a difference between the target number of motor revolutions and the counted number of motor revolutions, and look up gain to be applied to off time, in stored data, wherein the stored data comprises gain values correlating to calculated differences, and the processor may vary the time between the pulses of power to the motor by applying the gain to the off time.

The processor may identify a change in pressure of the liquid discharged from the outlet during an injection operation by comparing a measured value of motor current with a predetermined value of motor current.

The processor may calculate a difference between the predetermined value of motor current and the measured value of motor current and look up gain to be applied to a pulse force parameter selected from off time, pulse time and voltage, in stored data, wherein the stored data comprises gain values correlating to calculated differences, and the processor may vary the pulse force by applying the gain to a selected pulse force parameter.

The processor may calculate a difference between the predetermined value of motor current and the measured value of motor current and look up gain to be applied to the off time, in stored data, wherein the stored data comprises gain values correlating to calculated differences, and the processor may vary the time between the pulses of power to the motor by applying the gain to the off time.

The processor may detect the linear axial position of the plunger relative to the chamber from a sensor which is in communication with the processor. In one embodiment, the axial position sensor can be used in lieu of an encoder to monitor the output of the electric motor.

There is also provided an apparatus for injecting liquid into a plant comprising a variable volume dosing chamber with a plunger disposed within the chamber and a chamber inlet and outlet, the inlet and outlet in fluid communication with a common volume of the chamber, wherein the plunger translates in a linear direction relative to the chamber along a common longitudinal axis;

a power source; a motor configured to drive translation movement of the piston via a threaded shaft causing a change in volume in the chamber and liquid to be alternatively received and discharged from the chamber;

an encoder mounted on the motor to register motor revolutions, the encoder outputting a set number of steps per motor revolution; a trigger; a processor in communication with the power source, the motor, the encoder and the trigger, the processor being configured to count motor revolutions from the encoder, control voltage to the motor, and to control power to the motor by creating a plurality of pulses of power that provide energy to said motor (pulse force); identify a change in pressure of the liquid discharged from the outlet during an injection operation by monitoring the motor current or the number of revolutions of the motor; and vary the pulse force in response to the identified change in pressure to control the pressure of the liquid discharged from the outlet during an injection operation.

In one embodiment, when an encoder or similar sensor (piston axial position sensor) is present, a suitable pulse force parameter can be selected from off time, pulse time, voltage and current.

In another embodiment, when an encoder or similar sensor (piston axial position sensor) is not present, a suitable pulse force parameter can be selected from off time, pulse time, and voltage.

The processor may also be being configured to identify a change in pressure of the liquid discharged from the outlet during an injection operation by monitoring the motor current or the number of revolutions of the motor; and to vary the time between pulses of power to the motor (off time) in response to the identified change in pressure, where by the time between pulses is used to control the pressure of the liquid discharged from the outlet during an injection operation.

Monitoring the output of the electric motor may comprise using an encoder to count the number of revolutions of the motor and calculating the difference between the monitored output and the target output may comprise calculating the difference between the counted number of revolutions and a target number of revolutions.

Monitoring the output of the electric motor may comprise measuring motor current and calculating the difference between the monitored output and the target output may comprise calculating the difference between the measured motor current and a predetermined motor current.

BRIEF DESCRIPTION OF THE DRAWINGS

Having thus described the invention in general terms, reference will now be made to the accompanying drawings wherein:

DETAILED DESCRIPTION OF THE INVENTION

Certain exemplary examples of this disclosure are described below and illustrated in the accompanying figures. The examples described are only for purposes of illustration and should not be interpreted as limiting the scope of the invention, which, of course, is limited only by the claims below. Other examples, and certain modifications and improvements of the described examples, will occur to those skilled in the art and all such alternate examples, modifications, and improvements are within the scope of the present invention.

An example of a plant injection apparatus is described in the following, at least initially with reference to FIGS. 1-8.

Figure 2:
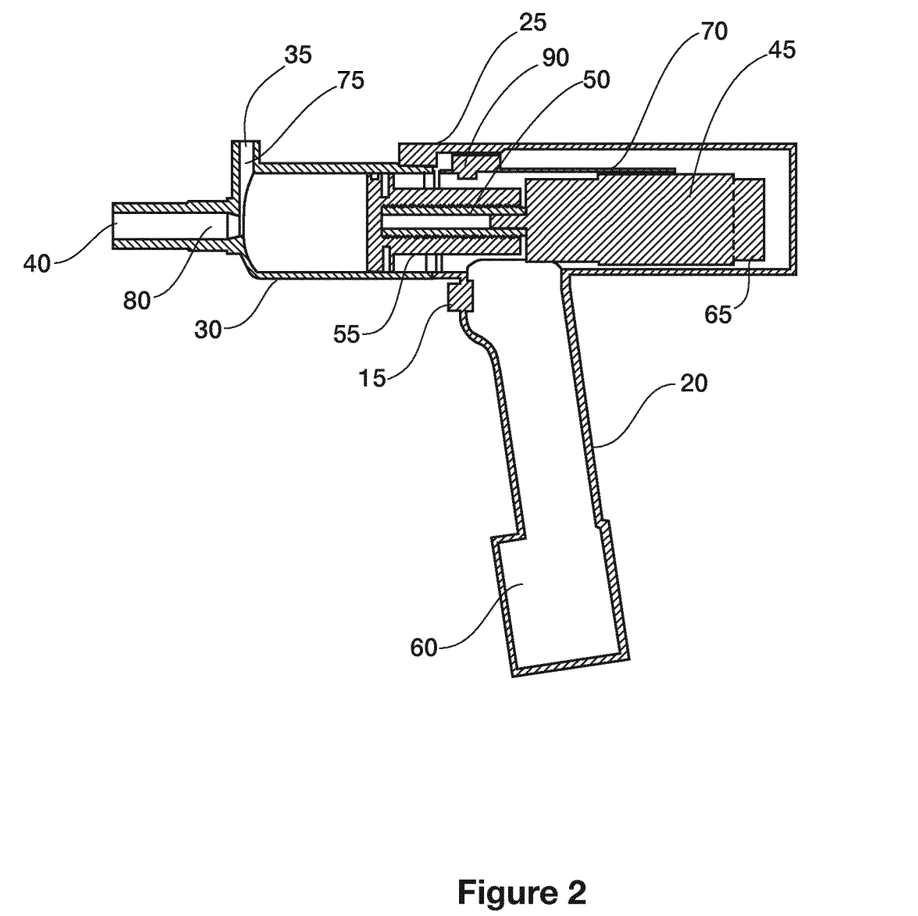
FIG. 2 is a side schematic, cutaway view of an integrated injection gun in accordance with one embodiment of the invention.

There is provided an injection apparatus for use in injecting a liquid composition into a plant, the apparatus comprising: a variable volume dosing chamber 30 with a plunger 55 disposed within the chamber 30 and a chamber inlet 35 and outlet 40. The inlet 35 and outlet 40 are in fluid communication with a common volume of the dosing chamber 30. The plunger (piston) 55 translates in a linear direction relative to the chamber 30 along a common longitudinal axis.

The apparatus 10 also comprises a power source 60 and an electric motor 45 configured to drive translation movement of the plunger 55 via a threaded shaft 50 causing a change in volume in the chamber 30 and thereby discharging a selected volume of the liquid composition from the chamber 30 through the outlet 40. After the injection, the plunger 55 moves in the opposite direction and causes chamber 30 to refill automatically from a liquid product supply 95 attached to the chamber via the inlet 35. The power source 60 can comprise mains power supply, a 12 volt power supply or a battery pack with optionally rechargeable batteries (such as lithium ion).

In one embodiment, the electric motor 45 has an encoder 65 mounted thereon to register motor revolutions (which also correlate with revolutions of the threaded shaft 50 and movement of plunger 55 within the chamber 30 which correlates to volume and dosage). The encoder 65 outputs a set number of steps per motor revolution.

Figure 1:
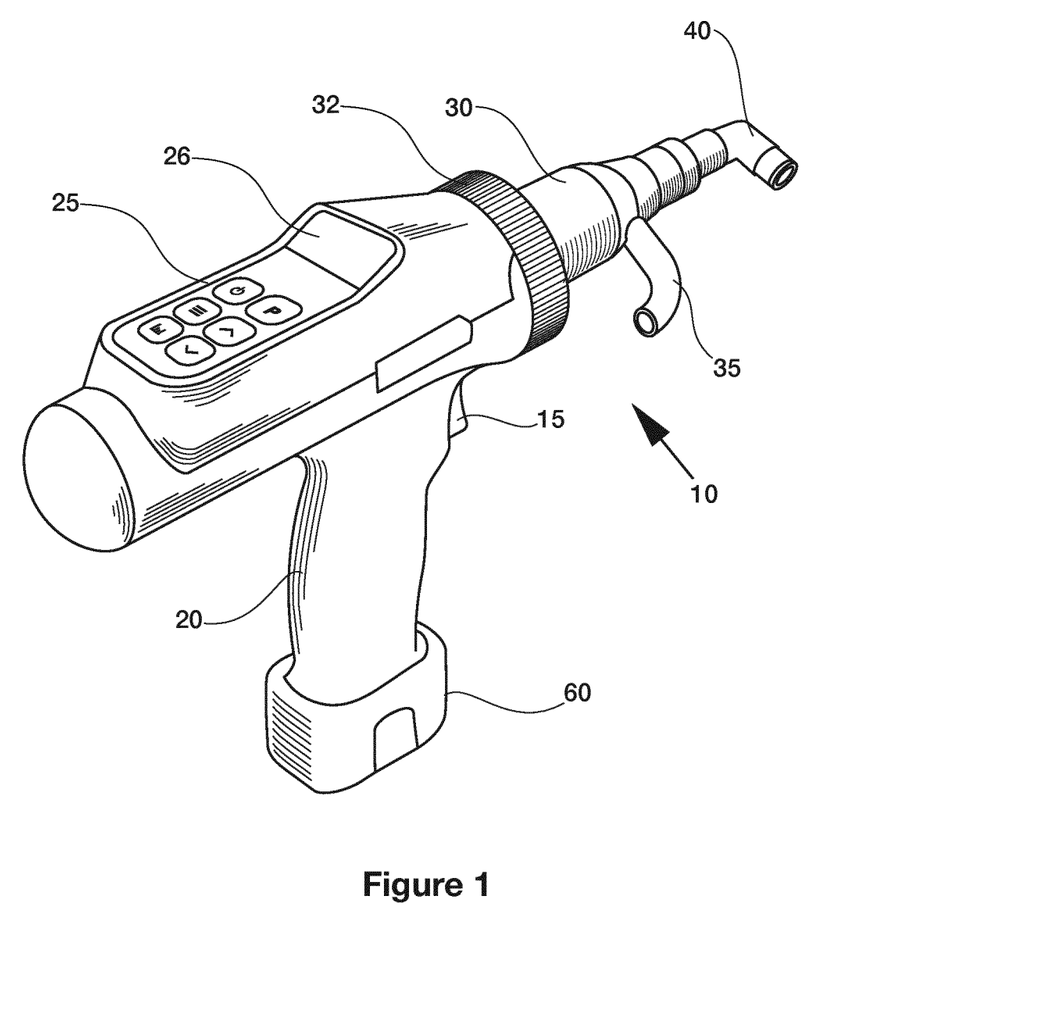
FIG. 1 is a perspective view of an integrated injection gun in accordance with one embodiment of the invention.

In one example, the apparatus comprises an integrated injection gun 10 with a hand grip 20 that is actuated by a trigger 15. The apparatus may further comprise a screw cap 32 for removing the dosage assembly from the rest of the gun 10 in order to service the apparatus.

The injection apparatus further comprises a processor (controller) 70 in communication with the power source 60, the electric motor 45, and the trigger 15. If the encoder 65 is present, the processor 70 is in communication therewith. The processor 70 is configured to control voltage to the motor 45, and control power to the motor by creating a plurality of pulses of power 100 that provide energy to said motor 45. When the encoder 65 is present the processor 70 is configured to count motor revolutions from the encoder 65.

Figure 8:
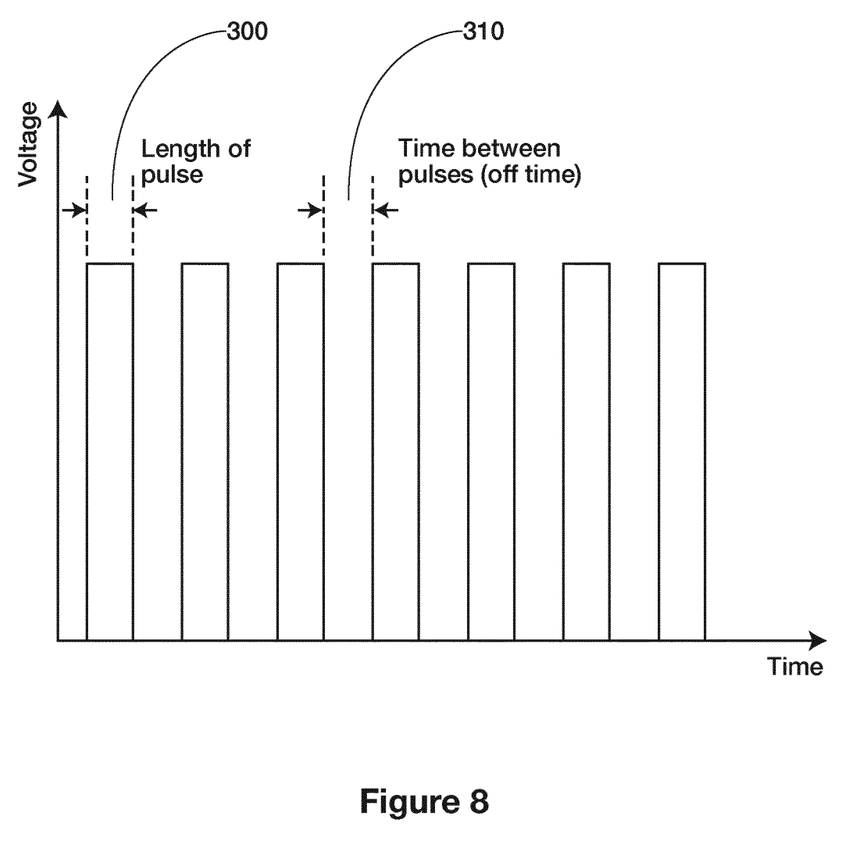
FIG. 8 illustrates a series of pulses of power that are supplied to the electric motor in accordance with one embodiment of the invention.

Each pulse has a voltage and a pulse length (time). The magnitude of voltage and the pulse length are certain parameters which define the pulse force provided to the motor 45. The magnitude of the voltage, the length of the pulses and the time between pulses determine the energy provided to the motor 45. The time between pulses is also referred to as the off time. FIG. 8 illustrates a plurality of pulses in the form of square pulses of voltage, each with a pulse length 300, and separated by an off time 310. The energy provided to the motor is controlled by the processor 70 to control the pressure of the liquid discharged from the outlet.

The time between the pulses of power to the motor may be varied (off time) 130 to control the energy to the motor. By varying the off time, and so controlling the energy to the motor 45, the pressure of the liquid discharged from the outlet 40 is controlled. More specifically, the pressure may be controlled by identifying a change in step count registered by the encoder 65 relative to the target step count, which is representative of a change in pressure of the fluid. As an example, an increase in pressure in the fluid, for example due to a restriction to the injection of the fluid by the tree, will cause the step count to be less than the target step count. The off time can then be adjusted to maintain a substantially constant pressure in the injection fluid.

In another example, the energy to the motor 45 may be varied by maintaining the time between pulses and instead altering voltage or current (amperage) to control the pressure. A suitable pulse force parameter can be selected from off time, pulse time, voltage and current.

In one example, the apparatus further comprises an inlet valve 75 positioned between the chamber 30 and the fluid inlet 35, and an outlet valve 80 positioned between the chamber 30 and outlet 40.

In one example, a sensor 90 in communication with processor 70 is mounted to detect the linear axial position of plunger 55 relative to chamber 30 such that the processor 70 can allow for any wear or slippage in the shaft 50, plunger 55, motor 45 or encoder 65. The sensor 90 may read an external signal from the chamber walls, one example being an electrical signal about a wall point or region. Another example may be to use a physical stop that acts as a reference point. A further example may be a magnet or magnets that interact with a plunger at a point or region of the chamber.

The apparatus may include a keypad interface 25. The interface may be one or more displays 26. The displays may be controlled via touch screen and/or controlled via one or more buttons or switches.

The apparatus may be in communication with a storage medium which contains information relating to particular trees or plantations. The apparatus may communicate with the storage medium to adjust the injection settings for the particular tree or plantation. The tree or plantation may be identifiable via a graphic encoding, such as a barcode or a QR code. The storage medium may be located in the apparatus itself or may be remote. Communication may be via the operative, in that the operative looks up the information in the storage medium, and programs the settings into the apparatus.

In another embodiment, the apparatus comprises communication means configured to transmit information about the device to an external receiver or mobile phone device to interact with an app or the cloud. The processor is configured to instruct the communication means to transmit information to the external receiver when, for example, a communication status is activated by a user. Any suitable communication means may be used. For example, the communication means may be configured to transmit information via WiFi, Bluetooth, ZigBee or similar.

The power source 60 may be a DC power supply. In one example, the power source may be at least one battery such as lithium 18650 cells. The power source may alternatively be a mains power source with or without a DC converter.

Suitably, the motor 45 may be a standard DC motor that is supplied with an encoder. Optionally, a planetary gearbox or a stepper motor can be used. When a stepper motor is used a separate encoder is not required. Preferably, a standard DC motor is used. In one implementation, the motor is a DC 12V, 12.8 W motor with a rated torque of 250 g-cm at 4930 rpm.

According to another example there is provided a kit of parts for providing a tree injection apparatus, the kit of parts comprising a tree injection apparatus as described in any one of the examples or aspects provided herein.

In one example, when trigger 15 is actuated to provide a dose of liquid composition (fluid), the electric motor 45 receives a pulse of power 100 which rotates the drive thread 50 and moves the piston 55 forward in the dose chamber 30 resulting in fluid being discharged from the chamber 30 via outlet 40. Motor revolutions may be counted by an encoder 65 mounted on the motor 45, the encoder 65 outputting a set number of steps per motor revolution.

The processor 70 is configured to identify a change in pressure of the liquid discharged from the outlet during an injection operation. In one example, as shown in FIG. 9., pressure is determined by voltage, the length of the pulse and the encoder step count (step 110), where voltage and pulse time determine the force of each pulse and step count measures how far the piston has travelled. A known voltage, at a known pulse time and a known step count will produce a known pressure. Preferably, the correlation of pressure targets to voltage, step count, and pulse time is calibrated and preset on the circuit board. If voltage and pulse time are held constant, the step count is controlled by the time between motor pulses, referred to as the pulse off time.

The processor 70 is further configured to control the pressure of the liquid discharged from the outlet during an injection operation in response to an identified change in pressure. In the example of FIG. 9, the algorithm (FIG. 9) adjusts the off time to control the step count and thus the pressure. The preset, known step count is referred to as the target step count which is correlated to a particular fluid pressure. Once the step count reaches a target number, the algorithm adjusts the off time to maintain the target step count. If the step count exceeds the target step count, the algorithm decreases the off time. If the step count equals the target step count, the algorithm maintains the off time. If the step count is less than the target step count, the algorithm increases the off time. Alternatively, the algorithm is adjusted to utilize another suitable pulse force parameter selected from pulse time, voltage and current in order to dynamically adjust outlet/injection pressure. The off time parameter is preferred.

Figure 7:
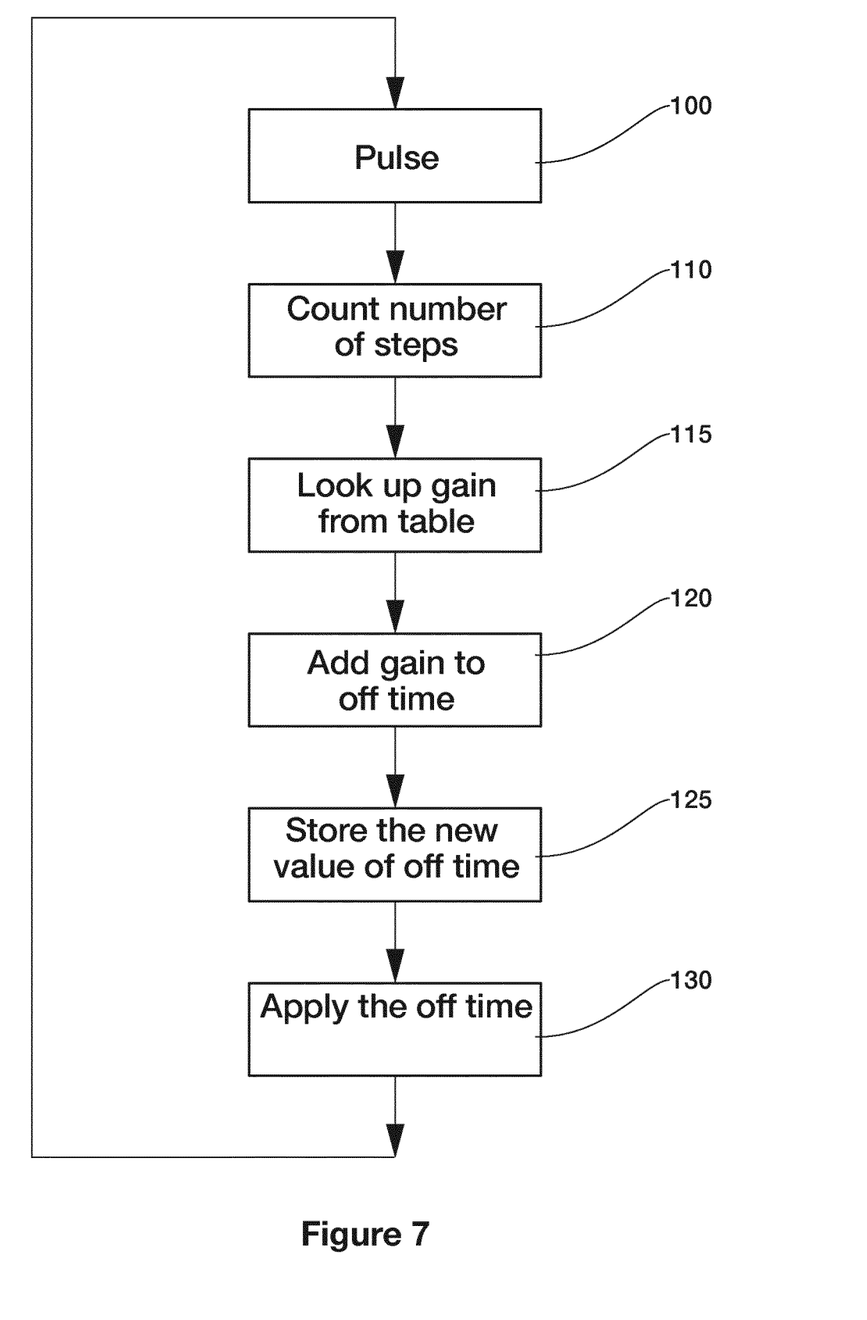
FIG. 7 illustrates a flow diagram for a motor pulse force adjustment algorithm in accordance with one embodiment of the invention.

In one example, the change in off time, referred to as gain, can be positive or negative. Gain is proportional to the difference between the measured step count and the target step count. For example, using a target step count of 9, a pulse of power 100 is provided to motor 45. In this example, if the number of steps are counted 110 and determined to be 11, (which is +2 above the target of 9), the algorithm will query a look up table 115 and will reduce the off time by a value proportional to +2 120 as provided in the table. The new value of off-time is then stored 125 and is applied 130 prior to the next pulse 100. Alternatively, if the step count is 7, which is −2 below the target of 9, the algorithm will increase the off time by a value proportional to −2. The value of gain can be calculated from a formula, such as, Gain= (9−the step count)×Y, where Y is a predetermined value (preset on the circuit board based on factory pressure measurement). Alternatively the value of gain can be provided by a look up table where for any given step count there is a predetermined value of gain.

Look Up Table Example for a Target Step Count of 9

| Encoder Step count | Gain (milli seconds) |
| --- | --- |
| 13 | −320 |
| 12 | −180 |
| 11 | −80 |
| 10 | −20 |
| 9 | 0 |
| 8 | 100 |
| 7 | 2000 |
| 6 | 4500 |
| 5 | 8000 |

In another example the algorithm measures motor current to predict the rate of change of pressure, referred to as predictive gain. When the pressure acting on the piston increases, the motor current in each pulse also increases. The motor current, pulse width and step count are correlated with pressure, and the correlation is stored in the processor 70. The correlation may be formulaic, or in the form of a lookup table. For a given target step count if the current is above or below a predetermined amount, the algorithm will increase or decrease the gain. For example if the step count is 9 and the current is above a predetermined value, the algorithm will determine that the pressure is increasing and will increase the gain. In other words, the algorithm will determine that the pressure is increasing, and so increase the time between pulses to reduce the step count, and so maintain injection pressure. In this example the encoder 65 may be omitted.

In a preferred example, the algorithm does not measure motor current to predict the rate of change of pressure.

One Preferred Example Consists of:
- a variable volume chamber with a piston disposed within the chamber and a chamber inlet and outlet, the inlet and outlet communicating directly with a common chamber volume, wherein the piston is configured to translate linearly relative to the chamber along a common longitudinal axis;
- a power source;
- a motor configured to drive translation movement of the piston via a threaded shaft thereby causing a change in volume in the chamber and fluid to be discharged from the chamber;
- an encoder mounted on the motor to register motor revolutions, the encoder outputting a set number of steps per motor revolution;
- a trigger;
- a processor in communication with the power source, the motor, the encoder and the trigger, the processor being configured to count motor revolutions from the encoder, control voltage to the motor, control pulse of power to the motor and vary the time between pulses of power to the motor (off time), where by the time between pulses is used to control the pressure;
- a tree injection wand or palm lance in communication with the chamber outlet and a cavity in a tree;
- where by in operation, fluid is dispensed into the tree at a controlled pressure.

EXAMPLE

By way of example, to deliver a 2 bar pressure in the tree, the processor instructs the power source to provide a pulse, being 20 ms at 6.5V, to the motor with an initial off time of 50 ms, where a 20 ms pulse at 6.5V is known to produce 2 bar pressure at a target step count of 9 and a minimum off time of 50 ms. The motor rotates a number of revolutions resulting in fluid being dispensed into the tree. The encoder outputs the number of steps to the processor. Using the look up table (shown above), if the number of steps is more than 9, the process is repeated with the 50 ms off time. If the number of steps is equal to nine, the process is repeated with the 50 ms off time. If the number of steps is 8, the process is repeated but the off time will become 150 ms which is equal to the existing 50 ms plus 100 ms from the look up table. If the next step count is 9, then the off time will remain at 150 ms. If the step count is 10, then the off time will become 130 ms which is equal to the existing 150 ms less 20 ms from the look up table. If the next step count is again 10, then the off time will become 110 ms, which is the existing 130 ms less 20 ms from the look up table.

In one implementation, the total step count in an injection operation for a 5 ml dose is 637 steps, a 4 ml dose is 510 steps and a 2 ml dose is 255 steps.

In one implementation, the apparatus will have a control panel interface 25 and a display screen 26 configured as follows:

Main screen: The tree type is prominently displayed in the main screen with the pressure and dose size below. The top-right corner shows the battery level.

Power button: Press once to switch on. Press and hold to switch off.

Prime button: Press to enter priming mode.

Menu button: Press through the options to access tree type, calculator, bottle reset, sound and language.

Statistics button: Shows how many doses have been administered and how much product has been used.

Up and Down buttons: Used to increase or decrease values and change a selection when displayed. Most setting changes are made using these buttons.

Power button: Press once to switch on a logo, followed by safety warnings may be displayed before the main screen appears. Press and hold momentarily to switch the apparatus off.

Prime button: Press the prime button once. The word "Prime" will be displayed to show that the apparatus is in Prime mode.

Once the apparatus is in prime mode, pull and hold the trigger. The apparatus will dispense a full chamber load and then return to the retracted position and stop. Release, then pull and hold the trigger again to dispense another full chamber. Continue until fully primed. The trigger may be released to stop priming at any time during the cycle.

Press the prime button again to enter micro prime mode. Pull the trigger and the apparatus will dispense a micro dose of fluid. Press the prime button again to return to the main screen.

Up and Down buttons: These buttons are used to increase or decrease values or to change a selection when displayed. Most setting changes are made using these buttons.

Changing the tree circumference: Pressing the up button once increases the circumference by 1 cm. Pressing and holding it scrolls the amount up quickly. The down button works in the same way.

Changing a selection: Pressing either the up or down arrow will change the selection for the current item. The selected option is shown with a box around it.

Menu buttons: Each time the menu button is pressed, it cycles through the menu for access to the following items: Tree Selection, Calculator, Bottle Reset, Sound and Language'.

Tree Selection: Press the menu button to display the tree selection screen. Press the up or the down arrow to change the tree selection. Press the menu button to save the selection.

1. Palm Tree. Dose size 5.2 ml and pressure 2 bar.
3. Conifer Tree. Dose size 4 ml and pressure 3 bar.
2. Dicot Tree. Dose size 2 ml and pressure 2 bar.
4. Rain Tree. Dose size 5.2 ml and pressure 2 bar.

Calculator: Press the up or down arrow to turn the calculator on or off. With the calculator on and Dicot, Conifer or Rain Tree selected, the apparatus will show the Tree Circumference screen at the start of a new tree.

Bottle Reset: Press the up or down arrow to reset the apparatus for a new bottle. The apparatus counts down the amount of product used. The screen displays a bottle symbol on the screen when the volume drops to 100 ml and displays a flashing symbol when the volume drops below 50 ml.

Sound: The apparatus can issue an audible double beep to confirm dose delivery. With the screen displaying the sound icon, press the up or down arrow to turn the sound on or off. This example shows the sound on.

Language: Press the up or down arrow to select the language.

Statistics button: The statistics button shows the total volume administered and the total number of doses administered. Each press scrolls through the various items.

Volume of administered dose: Shows the total volume of dose administered.

Number of doses: Shows the total number of trees administered.

To clear stored statistics, with the screen displaying the clear icon, press the up or down arrow to select the tick or the cross. With the tick highlighted, press the menu button. The display will return to the main menu, and the number of doses and volume statistics will be reset to 0.

Figure 3:
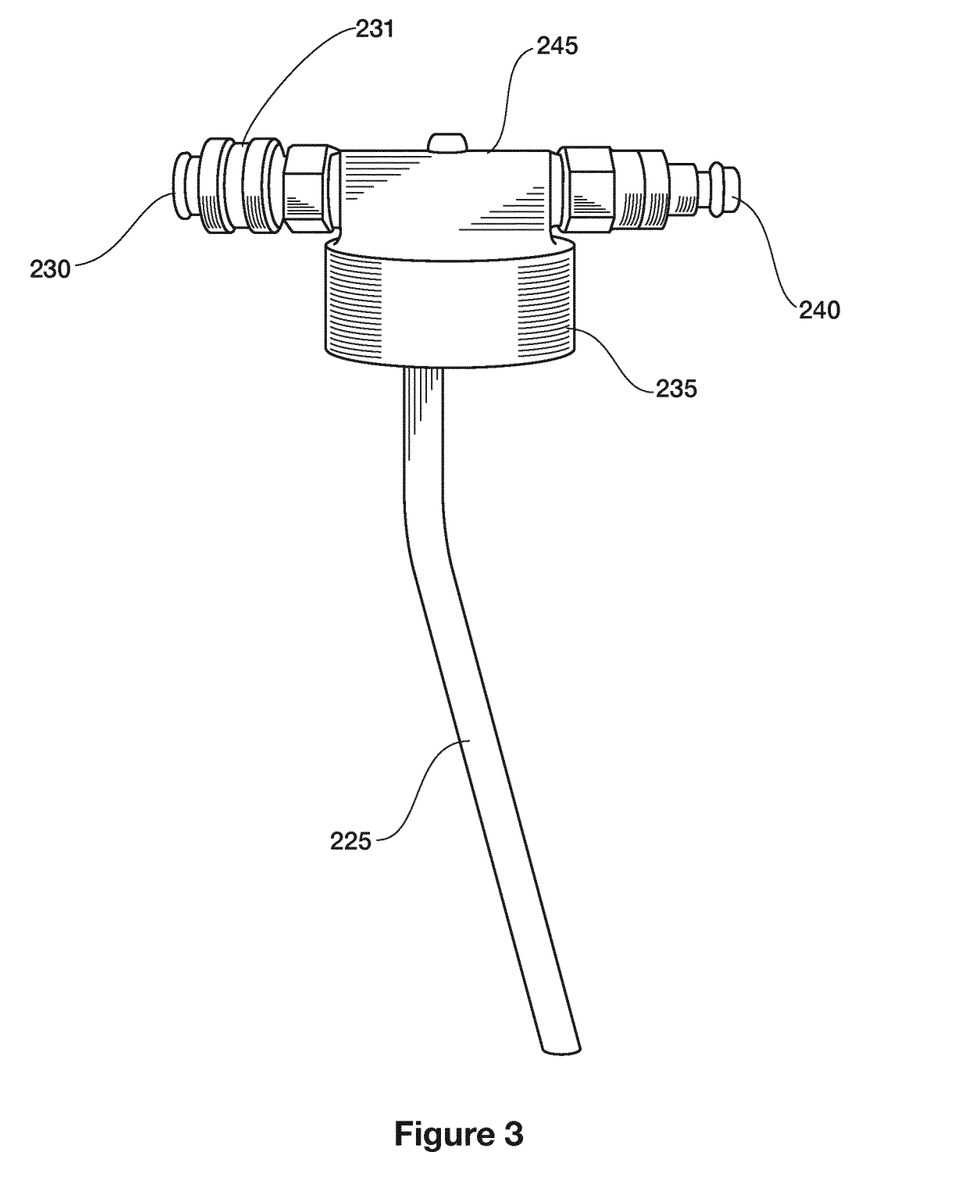
FIG. 3 is a plan view of a draw off assembly in accordance with one embodiment of the invention.

Preparing the Apparatus for Use:

After connecting the draw off assembly 245 to a product bottle 95 containing a liquid composition (placing draw off tube 225 in the bottle 95 and covered with cap 235 and connect to the hand held 10 to the inlet 35 via tube 250 coupling socket 230 and seal with coupling socket ring 231); and then connecting one end of the tube 218 to outlet 40 via coupling 39 and seal with socket ring 37.

Connect the other end of tube 218 to draw off coupling plug 240). Set the apparatus to prime. Press and hold the trigger until fluid fills the chamber. Point the tip of the apparatus vertically to remove the last of the air from the chamber.

Press and hold the trigger until fluid flows back into the bottle 95. Disconnect the outlet tube assembly coupling socket 200 from the draw off coupling plug 240.

Figure 4:
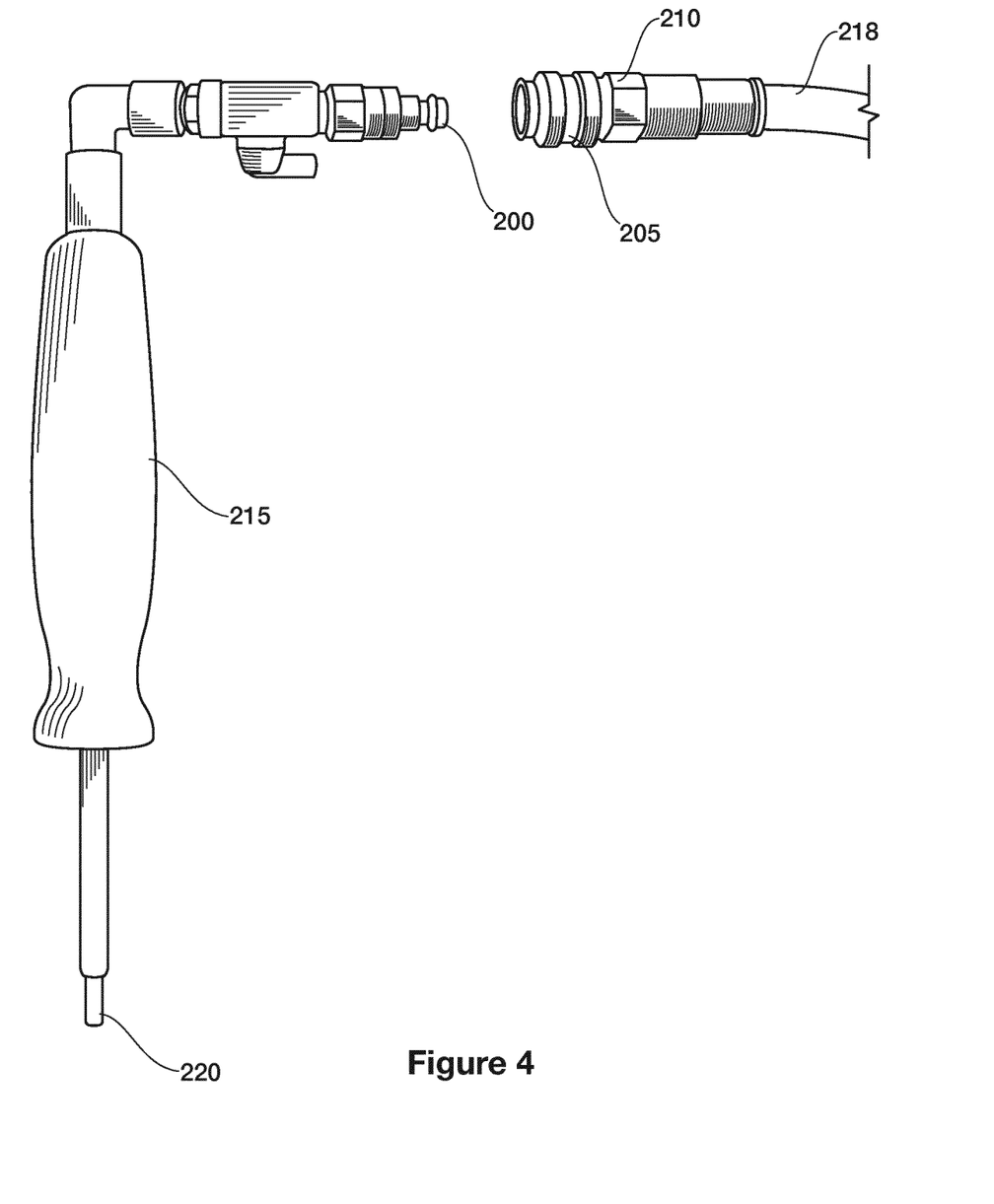
FIG. 4 is a plan view of a tree injection wand in accordance with one embodiment of the invention.
Figure 5:
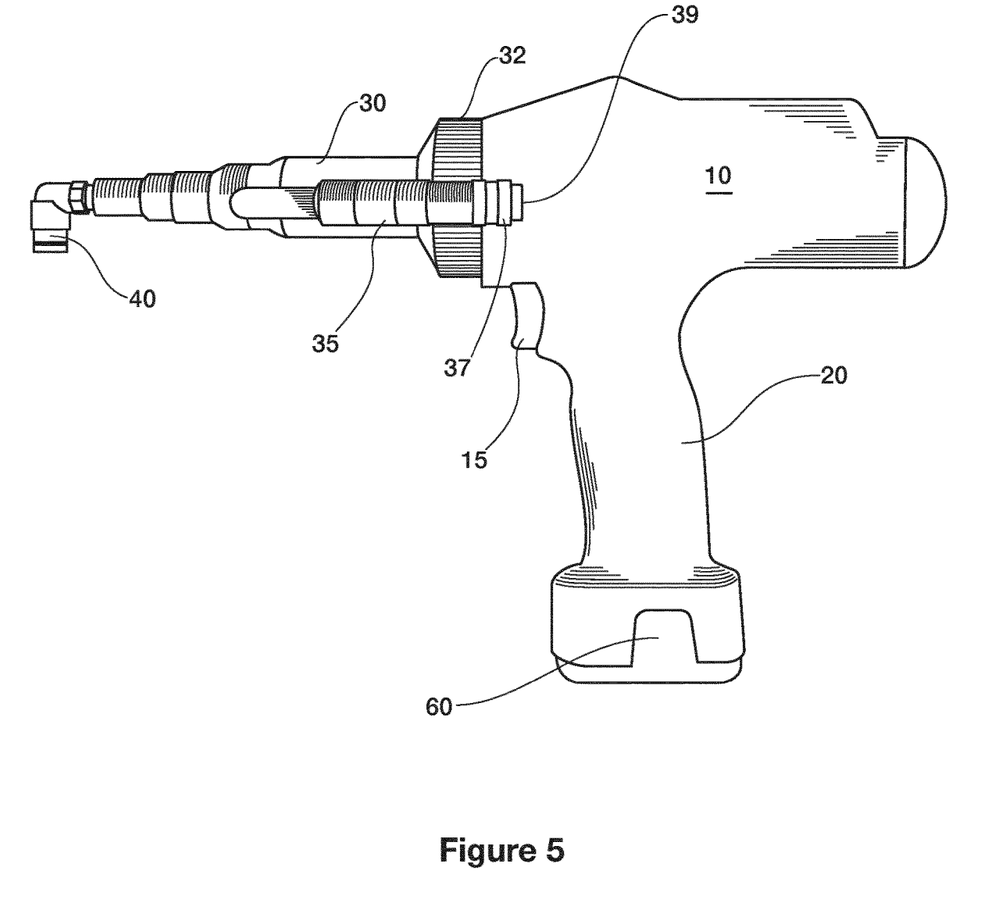
FIG. 5 is a side view of an integrated injection gun in accordance with one embodiment of the invention.
Figure 6:
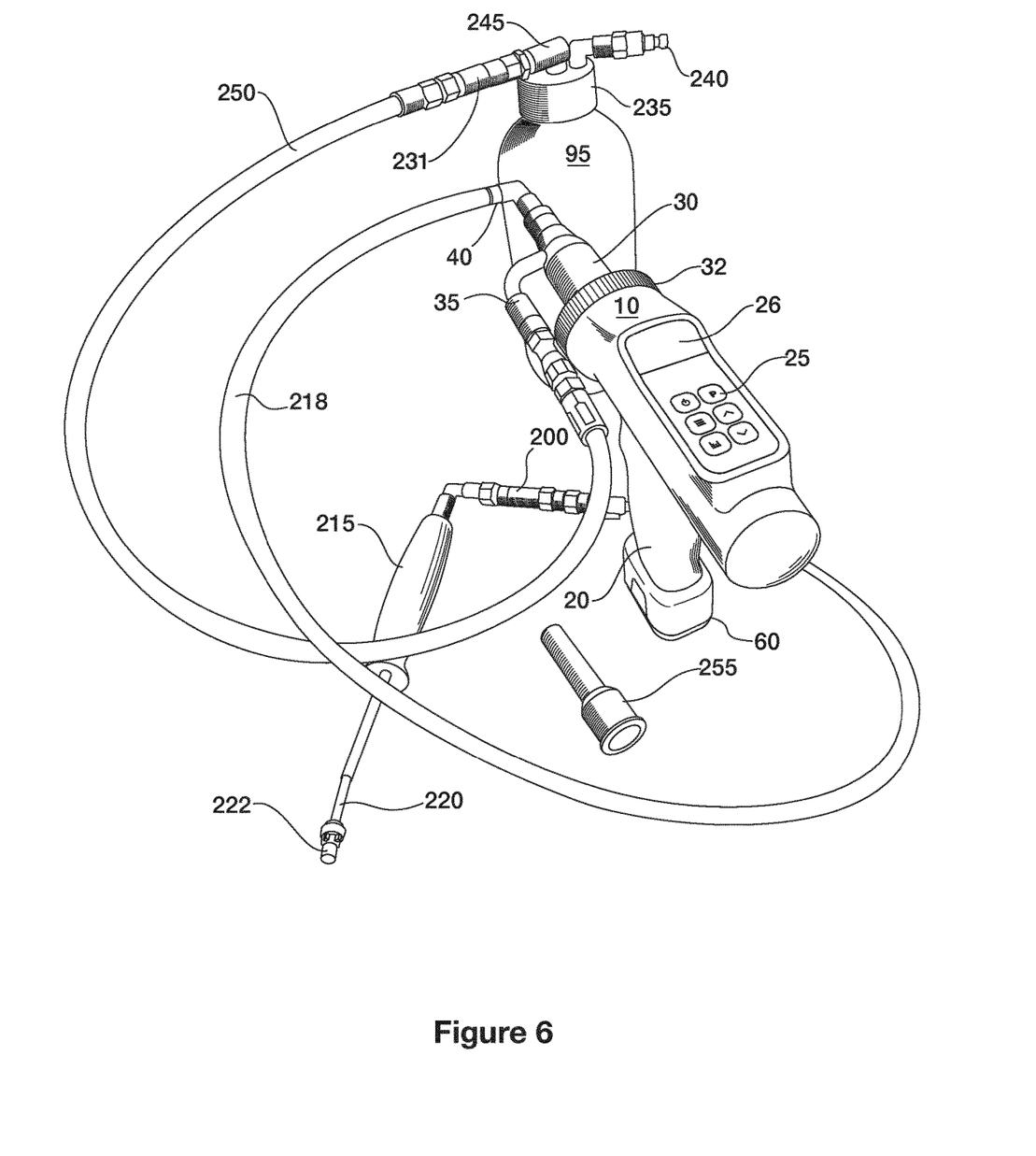
FIG. 6 is a perspective view of a tree injection apparatus assembly in accordance with one embodiment of the invention.

Connect the outlet 40 via tube 218 and assembly coupling socket 210 to either the palm lance wand (not shown) or tree injector wand 215 (FIG. 4). Seal with coupling socket ring 205. Click the prime button to set the apparatus to micro prime. Press the trigger until fluid reaches the outlet tip 220. Press the prime button to return to the home screen. An optional plug 222 can be attached to wand tip 220 for placement into a drill hole prior to the injection operation. Alternatively, the tip 220 can be covered with a cap 255 in between injection operations. In one implementation, the length of tubes 218 and 250 is from 1 to 5 meters and the tube width is from 3 to 6 mm. In another implementation, the outlet tip 220 of wand 215 is 2 mm.

To stop a dose press the P key or double press the trigger. The apparatus will cancel a dose if the pressure exceeds the recommended maximum setting for the apparatus.

Follow the recommendations for the product being administered regarding protective clothing, eye wear and handling precautions.

In Palm mode, press the trigger to deliver a dose. The screen will display a dosing symbol. When the dose is complete the screen will display a tick symbol and the apparatus will sound a double beep.

In Dicot, Conifer and Rain Tree modes with the calculator turned off, press the trigger to deliver a dose. The screen will display a dosing symbol. When the dose is complete the screen will display a wait symbol. When the wait symbol has finished, the screen will display a tick and the apparatus will sound a double beep.

In Dicot, Conifer and Rain Tree modes with the calculator turned on, the screen will display the circumference. Press the up or down button to increase or decrease the circumference size, then press the menu key to calculate the number of holes to be drilled. The apparatus will count the holes as they are dosed. Press the trigger to deliver a dose. The screen will display a dosing symbol. When the dose is complete the screen will display a wait symbol. When the wait symbol has finished, the screen will display a tick and the apparatus will sound a double beep. The screen will then display the next hole number ready for the next dose.

To change the number of holes, press the up button or down button. The number of holes cannot be changed once the second to last hole has been reached. i.e. 11/12 cannot be changed to 11/11. After the last hole has been dosed the apparatus will wait 10 seconds before recording the total number of holes dosed. During the 10 second wait time, to change the total number of holes, press the up button or down button and then press the menu button to record the total number of holes dosed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

We claim:

1. An apparatus for injecting liquid into a plant comprising:
   a variable volume dosing chamber with a plunger disposed within the chamber and a chamber inlet and outlet, the inlet and outlet in fluid communication with a common volume of the chamber, wherein the plunger translates in a linear direction relative to the chamber along a common longitudinal axis;
   a power source;
   a motor configured to drive translation movement of a piston via a threaded shaft causing a change in volume in the chamber and liquid to be alternatively received and discharged from the chamber;
   a trigger;
   a processor in communication with the power source, the motor, and the trigger, the processor being configured to:
   control voltage to the motor, and to control power to the motor by creating a pulse force comprising a plurality of pulses of power that provide energy to said motor;
   identify a change in pressure of the liquid discharged from the outlet during an injection operation by monitoring the motor current or the number of revolutions of the motor;
   vary the pulse force in response to the identified change in pressure to control the pressure of the liquid discharged from the outlet during an injection operation; and
   wherein the processor uses the motor current or the number of revolutions of the motor to look up gain to be applied to a pulse force parameter selected from off time, pulse time, voltage and current, in stored data, and wherein the gain is applied to a selected pulse force parameter by the processor, to vary the pulse force.

2. The apparatus according to claim 1, wherein the pressure of the liquid discharged from the outlet during an injection operation is controlled to maintain a predetermined injection pressure.

3. The apparatus according to claim 1, further comprising an encoder mounted on the motor to register motor revolutions, the encoder outputting a set number of steps per motor revolution, and the processor being configured to count the number of revolutions from the encoder and to compare this to a target number of motor revolutions to identify a change in pressure of the liquid discharged from the outlet during an injection operation.

4. The apparatus according to claim 3, wherein the processor uses a calculated difference between the target number of motor revolutions and the counted number of motor revolutions to look up gain to be applied to the pulse force parameter selected from off time, pulse time, voltage and current, in stored data, wherein the stored data comprises gain values correlating to calculated differences, and wherein the gain is applied to the selected pulse force parameter by the processor, to vary the pulse force.

5. The apparatus according to claim 4, wherein the selected pulse force parameter is the off time.

6. The apparatus of claim 1, wherein the processor identifies a change in pressure of the liquid discharged from the outlet during an injection operation by comparing a measured value of motor current with a predetermined value of motor current.

7. The apparatus of claim 6, wherein the processor uses a calculated difference between the predetermined value of motor current and the measured value of motor current to look up the gain to be applied to the pulse force parameter selected from off time, pulse time and voltage, in stored data, wherein the stored data comprises gain values correlating to calculated differences, and wherein the gain is applied to the selected pulse force parameter, by the processor, to vary the pulse force.

8. The apparatus according to claim 7, wherein the selected pulse force parameter is the off time.

9. The apparatus according to claim 1, further comprising a sensor in communication with processor that is mounted to detect the linear axial position of the plunger relative to the chamber.

10. The apparatus according to claim 1, further comprising an integrated injection gun with a hand grip that is actuated by the trigger.

11. The apparatus according to claim 1, further comprising a keypad interface having one or more displays controlled via touch screen and/or controlled via one or more buttons or switches.

12. The apparatus according claim 1, wherein the pressure of the liquid discharged from the outlet during an injection operation is controlled when the processor generates a pulse, determines the gain from a look up table, obtains a new off time value by adding the gain from the look up table to the current off time, stores the new off time value; and applies the new off time value to the next pulse cycle.

13. A method of injecting liquid into a plant, the method comprising the steps of:
  providing a variable volume dosing chamber with a plunger disposed within the chamber and a chamber inlet and outlet, the inlet and outlet in fluid communication with a common volume of the chamber, wherein the plunger translates in a linear direction relative to the chamber along a common longitudinal axis;
  a power source;
  a motor configured to drive translation movement of a piston via a threaded shaft causing a change in volume in the chamber and liquid to be alternatively received and discharged from the chamber;
  a trigger; and
  a processor in communication with the power source, the motor and the trigger;
  controlling, using the processor, voltage to the motor, and power to the motor by creating a pulse force comprising a plurality of pulses of power that provide energy to said motor;
  identifying, using the processor, a change in pressure of the liquid discharged from the outlet during an injection operation by monitoring the motor current or the number of revolutions of the motor;
  varying, using the processor, and the pulse force in response to the identified change in pressure to control the pressure of the liquid discharged from the outlet during an injection operation; and
  using the motor current or the number of revolutions of the motor to look up gain to be applied to a pulse force parameter selected from off time, pulse time, voltage and current, in stored data, and wherein the gain is applied to a selected pulse force parameter by the processor, to vary the pulse force.

14. The method of claim 13, wherein the pressure of the liquid discharged from the outlet during an injection operation is controlled to maintain a predetermined injection pressure.

15. The method of claim 13, wherein the processor counts the number of motor revolutions from an encoder, the encoder being mounted on the motor to register the motor revolutions and to output a set number of steps per motor revolution, and the processor compares the counted number of revolutions to a target number of revolutions to identify a change in pressure of the liquid discharged from the outlet during an injection operation.

16. The method of claim 15, wherein the processor calculates a difference between the target number of motor revolutions and the counted number of motor revolutions, and looks up gain to be applied to the pulse force parameter selected from off time, pulse time, voltage and current, in stored data, wherein the stored data comprises gain values correlating to calculated differences wherein the processor varies the pulse force by applying the gain to the selected pulse force parameter.

17. The method according to claim 16, wherein the selected pulse force parameter is the off time.

18. The method of claim 13 wherein the processor identifies a change in pressure of the liquid discharged from the outlet during an injection operation by comparing a measured value of motor current with a predetermined value of motor current.

19. The method of claim 18 wherein the processor calculates a difference between the predetermined value of motor current and the measured value of motor current and looks up gain to be applied to the pulse force parameter selected from off time, pulse time and voltage, in stored data, wherein the stored data comprises gain values correlating to calculated differences, and wherein the processor varies the pulse force by applying the gain to the selected pulse force parameter.

20. The method according to claim 19, wherein the selected pulse force parameter is the off time.

21. An apparatus for injecting liquid into a plant comprising:
  a variable volume dosing chamber with a plunger disposed within the chamber and a chamber inlet and outlet, the inlet and outlet in fluid communication with a common volume of the chamber, wherein the plunger translates in a linear direction relative to the chamber along a common longitudinal axis;
  a power source;

a motor configured to drive translation movement of a piston via a threaded shaft causing a change in volume in the chamber and liquid to be alternatively received and discharged from the chamber;

a trigger;

a processor in communication with the power source, the motor, and the trigger, the processor being configured to:

control voltage to the motor, and to control power to the motor by creating a pulse force comprising a plurality of pulses of power that provide energy to said motor;

identify a change in pressure of the liquid discharged from the outlet during an injection operation by monitoring the motor current or the number of revolutions of the motor;

vary the pulse force in response to the identified change in pressure to control the pressure of the liquid discharged from the outlet during an injection operation; and the processor further being configured to perform at least one of:

using a calculated difference between a target number of motor revolutions and a counted number of motor revolutions to look up gain to be applied to the pulse force parameter selected from off time, pulse time, voltage and current, in stored data, wherein the stored data comprises gain values correlating to calculated differences, and wherein the gain is applied to the selected pulse force parameter by the processor, to vary the pulse force;

using a calculated difference between a predetermined value of motor current and a measured value of motor current to look up the gain to be applied to the pulse force parameter selected from off time, pulse time and voltage, in stored data, wherein the stored data comprises gain values correlating to calculated differences, and wherein the gain is applied to the selected pulse force parameter, by the processor, to vary the pulse force; and controlling the pressure of the liquid discharged from the outlet during an injection operation when the processor generates a pulse, determines the gain from a look up table, obtains a new off time value by adding the gain from the look up table to the current off time, stores the new off time value; and applies the new off time value to the next pulse cycle.

22. The apparatus according to claim 21, wherein the processor is configured to perform at least using the calculated difference between the target number of motor revolutions and the counted number of motor revolutions to look up gain to be applied to the pulse force parameter selected from off time, pulse time, voltage and current, in the stored data, wherein the stored data comprises gain values correlating to the calculated differences, and wherein the gain is applied to the selected pulse force parameter by the processor, to vary the pulse force.

23. The apparatus of claim 21, wherein the processor is configured to perform at least using the calculated difference between the predetermined value of motor current and the measured value of motor current to look up the gain to be applied to the pulse force parameter selected from off time, pulse time and voltage, in the stored data, wherein the stored data comprises the gain values correlating to the calculated differences, and wherein the gain is applied to the selected pulse force parameter, by the processor, to vary the pulse force.

24. The apparatus according claim 21, wherein the processor is configured to perform at least controlling the pressure of the liquid discharged from the outlet during an injection operation is controlled when the processor generates the pulse, determines the gain from the look up table, obtains the new off time value by adding the gain from the look up table to the current off time, stores the new off time value; and applies the new off time value to the next pulse cycle.

25. A method of injecting liquid into a plant, the method comprising the steps of:

providing a variable volume dosing chamber with a plunger disposed within the chamber and a chamber inlet and outlet, the inlet and outlet in fluid communication with a common volume of the chamber, wherein the plunger translates in a linear direction relative to the chamber along a common longitudinal axis;

a power source;

a motor configured to drive translation movement of a piston via a threaded shaft causing a change in volume in the chamber and liquid to be alternatively received and discharged from the chamber;

a trigger;

and a processor in communication with the power source, the motor and the trigger;

controlling, using the processor, voltage to the motor, and power to the motor by creating a pulse force comprising a plurality of pulses of power that provide energy to said motor;

identifying, using the processor, a change in pressure of the liquid discharged from the outlet during an injection operation by monitoring the motor current or the number of revolutions of the motor;

varying, using the processor, the pulse force in response to the identified change in pressure to control the pressure of the liquid discharged from the outlet during an injection operation;

and the processor performing at least one of:

calculating a difference between the target number of motor revolutions and the counted number of motor revolutions, and looks up gain to be applied to the pulse force parameter selected from off time, pulse time, voltage and current, in stored data, wherein the stored data comprises gain values correlating to calculated differences, wherein the processor varies the pulse force by applying the gain to the selected pulse force parameter; and calculating a difference between the predetermined value of motor current and the measured value of motor current and looks up gain to be applied to the pulse force parameter selected from off time, pulse time and voltage, in stored data, wherein the stored data comprises gain values correlating to calculated differences, and wherein the processor varies the pulse force by applying the gain to the selected pulse force parameter.

26. The method of claim 25, wherein the processor calculates the difference between the target number of motor revolutions and the counted number of motor revolutions, and looks up the gain to be applied to the pulse force parameter selected from off time, pulse time, voltage and current, in the stored data, wherein the stored data comprises gain values correlating to calculated differences, wherein the processor varies the pulse force by applying the gain to the selected pulse force parameter.

27. The method of claim 25, wherein the processor calculates the difference between the predetermined value of motor current and the measured value of motor current and looks up the gain to be applied to the pulse force parameter selected from off time, pulse time and voltage, in stored data, wherein the stored data comprises gain values correlating to calculated differences, and wherein the processor varies the pulse force by applying the gain to the selected pulse force parameter.

* * * * *